United States Patent [19]

Flaum et al.

[11] 4,033,217

[45] July 5, 1977

[54] SLITTER HAVING CARRIER FOR SELECTIVE ADJUSTMENT OF A PLURALITY OF HEADS

[75] Inventors: Stephen S. Flaum, New York; Francis A. Connolly, College Point; Paul Chu, Amityville, all of N.Y.

[73] Assignee: S&S Corrugated Paper Machinery Co., Inc., Brooklyn, N.Y.

[22] Filed: Jan. 13, 1976

[21] Appl. No.: 648,665

[52] U.S. Cl. ................................ 83/425.4; 83/481; 83/499; 83/9; 93/1 G; 93/58.2 R

[51] Int. Cl.² ..................... B23D 19/06; B26D 1/24

[58] Field of Search .............. 83/425, 425.2, 425.3, 83/425.4, 481, 498, 499, 9, 479; 93/58.2, 1 G

[56] References Cited

UNITED STATES PATENTS

| | | | |
|---|---|---|---|
| 3,587,374 | 6/1971 | Stewart | 83/479 X |
| 3,760,697 | 9/1973 | Besemann | 83/425.4 X |
| 3,882,765 | 5/1975 | Tokuno | 83/9 X |

*Primary Examiner*—Othell M. Simpson
*Assistant Examiner*—W. D. Bray
*Attorney, Agent, or Firm*—Ostrolenk, Faber, Gerb & Soffen

[57] ABSTRACT

A duplex slitter is provided with two stationary stations each having one or more pairs of drive shafts rotated on fixed centers and carrying a plurality of slitting and creasing head pairs. Each station is provided with a single mechanism for power adjustment of all head pairs. The mechanism is movable the entire length of the shafts and is selectively engageable and disengageable with each head pair. After the head pairs are in desired longitudinal positions along the shafts, the adjusting mechanism is parked at one end of the shafts outboard of the web path or working area of the station.

11 Claims, 9 Drawing Figures

2
2
10
13
14
15
16
21
22
23
24
50
51
52
53
54
55
56
57
60
61
62
63
64
65
66
67
68
69
71
72
75
76
77
78
79
80
81
82
83

SLITTER HAVING CARRIER FOR SELECTIVE ADJUSTMENT OF A PLURALITY OF HEADS

This invention relates generally to apparatus for producing sheets of corrugated board and the like and more particularly relates to a multiple station slitter.

Corrugated board is produced as a relatively wide web which is cut longitudinally by a slitter into a plurality of narrow webs that are subsequently cut transversely into sheets. The slitter also indents or creases the board, when necessary, to facilitate subsequent folding operations.

To prevent excessive downtime of the very expensive corrugator and related machinery when adjusting the slitter for a new order, the slitter is constructed to have a plurality of stations one of which is adjusted for the next run while another station is operating on the wide web. For the most part, prior art slitters were constructed so that the stations were movable to a single paper line along which the web travelled through the slitter. At the same time the station having the cutting and creasing heads to be adjusted for the next run was moved to an advantageous position for head adjustment. In a typical plant, slitters have to be reset or adjusted 30 times for an 8 hour shift. Most prior art slitters required that the head pairs, typically a total of 13 pairs for each station, be adjusted individually and manually with the operator being required to perform these adjustments in relatively tight quarters close to rotating slitter and creaser heads so that adjustment was an unpleasant, time-consuming, and potentially dangerous operation. Because of this the prior art has attempted to provide power driven adjusting means.

A power driven adjusting means for slitter heads is disclosed in U.S. Pat. No. 3,646,418 issued Feb. 28, 1972, to R. B. Sterns et al. for Positioning Of Multiple Elements. In the device of the Sterns et al. patent an individual adjusting mechanism is provided for each head pair with the multiplicity of head adjusting devices making the apparatus relatively expensive. Further, controls must be able to determine the motions of all head adjusting devices simultaneously. This requires either a separate sensor in each head adjusting device or at least separate controls for starting and stopping each head adjusting device. Utilizing separate controls on each head adjusting device requires all the devices to be driven by a common lead screw in order that a single sensor be used. With a single sensor arrangement of this type revolutions of the lead screw are counted between the time a given head adjusting device is engaged with the lead screw to the time when the device disengages from the lead screw. However, this requires means for independently engaging and disengaging each head adjusting device with the lead screw and means of automatically controlling these engaging and disengaging devices, all of which adds considerably to the expense of the apparatus, and the multiplicity of the elements increases the likelihood of failure.

In order to overcome the above-noted difficulties of the prior art, the instant invention provides two substantially identical slitter stations each of which is provided with head carrying shafts that are rotated on fixed centers. A single head adjusting device provided for each station is constructed so that it selectively engages each head pair to sequentially move the head pairs to selected positions along the lengths of their drive shafts. When all head pairs are in their required positions, the single head adjusting device is moved to one end of the drive shafts where the device is parked at a position outboard of the working area through which the corrugated board web travels. While the head adjusting device engages the heads in sequence, a degree of simultaneous adjustment is obtained in that when the device engages and moves one head this head may impart motion to an adjacent head moving the latter towards its position.

Accordingly, a primary object of the instant invention is to provide a novel construction for a slitter having power driven means for adjusting the slitter heads.

Another object is to provide a power adjusted slitter in which all of the slitter drive shafts are rotated on fixed centers.

Still another object is to provide a slitter device of this type with a head adjusting device that sequentially engages the slitter heads for movement thereof to desired positions along the length of the drive shaft.

A further object is to provide a slitter device of this type in which the adjusting device requires very little motion to operatively engage and disengage the heads.

A still further object is to provide a slitter device of this type in which the common adjusting device is moved out of the working area of the slitter station through which the web travels by the same means that moves the heads along the drive shaft.

These objects as well as other objects of this invention shall become readily apparent after reading the following description of the accompanying drawing in which.

Figure 3:
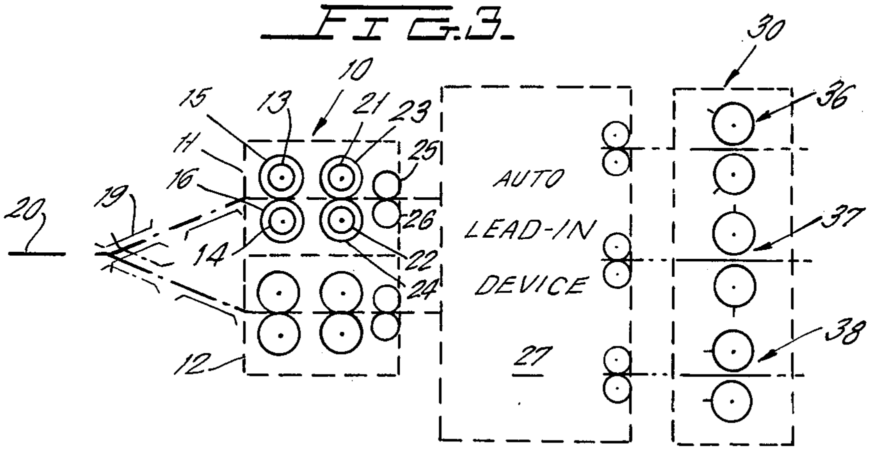
FIG. 3 is a side elevation in schematic form showing the slitter of the instant invention in relation to a triple cutoff.
Figure 4:
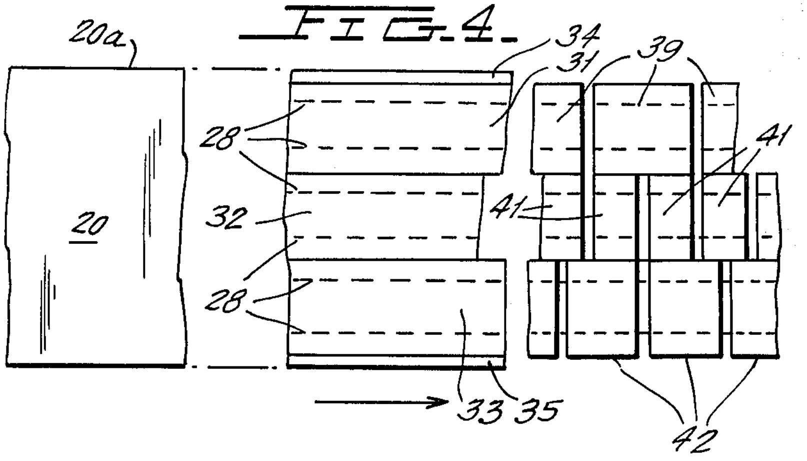
FIG. 4 is a plan view of corrugated board as it passes through the various sections of the apparatus illustrated in FIG. 3.

Now referring to the figures and more particularly to FIGS. 3 and 4, power adjusted slitter 10 includes upper 11 and lower 12 stations that are essentially of the same construction including a pair of shafts 13, 14 which carry a plurality of pairs of creaser heads 15, 16. In addition, each station 11, 12 also includes another pair of shafts 21, 22 which carry a plurality of pairs of slitter heads 23, 24.

A relatively wide corrugated web 20 issuing from a double backer (not shown) moves from left to right with respect to FIG. 3 and is directed to one or the other of slitter stations 11, 13 by guide 19 that is selectively operable from the upper solid line position of FIG. 3 to the lower phantom position. With guide 19 in the solid line position shown, wide web 20 is directed to upper slitter station 11 between pairs of scoring heads 15, 16 and between pairs of slitting heads 23, 24 to the nip between takeoff rollers 25, 26 into automatic lead-in device 27 of a construction described in detail in copending application Ser. No. 721,380 filed Sep. 8, 1976 and assigned to the assignee of the instant invention. The scoring heads 15, 16 apply score lines 28 to web 20 and slitter heads 23, 24 cut web 20 into relatively narrow webs 31, 32, 33 as well as trim edges 34, 35. Web 31 is directed to the upper pair of knife bars 36 of triple cutoff 30 which cuts web 31 transversely into equal length sheets 39. In a similar manner narrow webs 32, 33 are directed to middle and lower knife bars 37, 38 respectively to produce sheets 41 from web 32 and sheets 42 from web 33.

Figure 1:
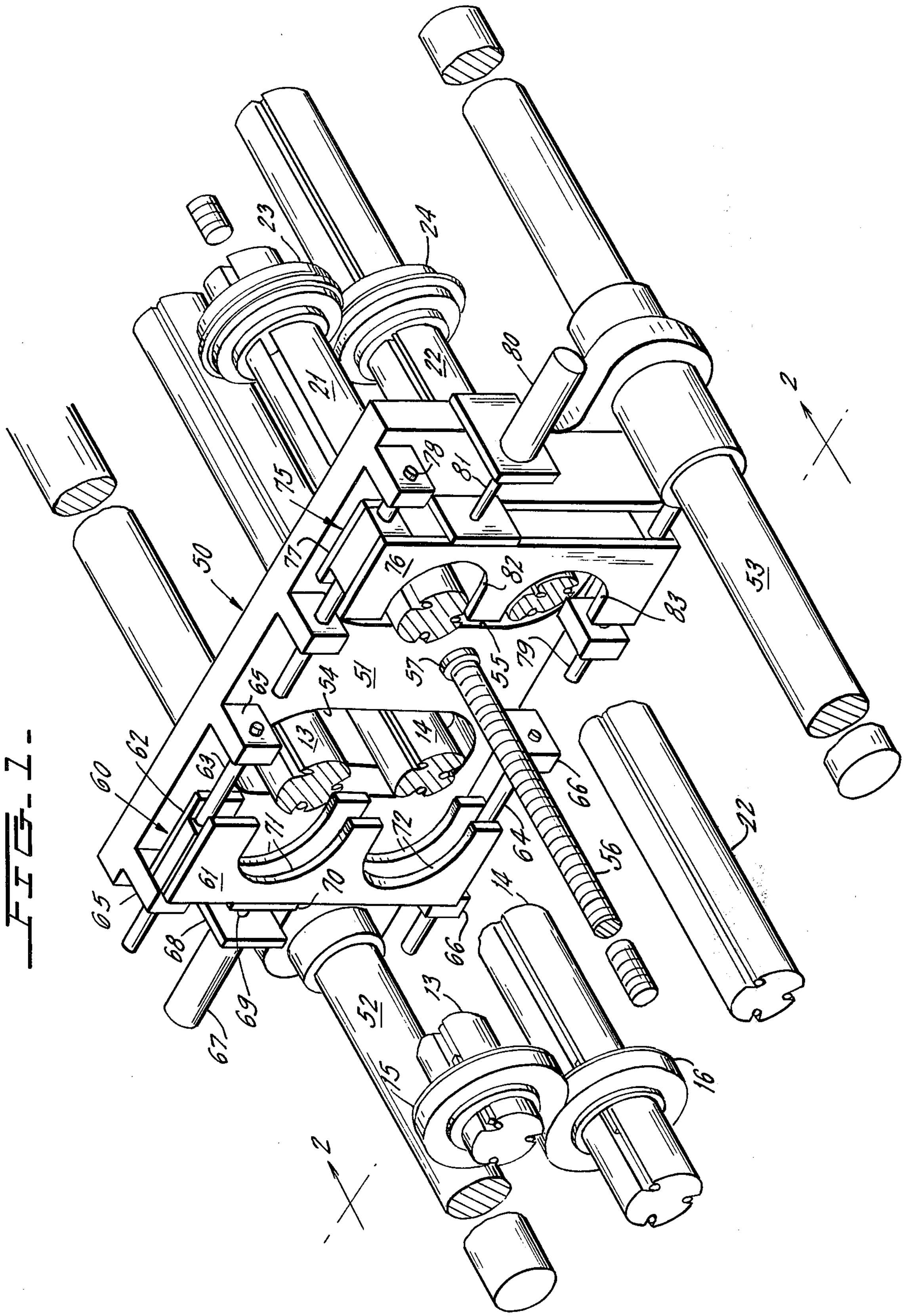
FIG. 1 is a perspective illustrating a fragmentary portion of a slitter station constructed in accordance with teachings of the instant invention.
Figure 2:
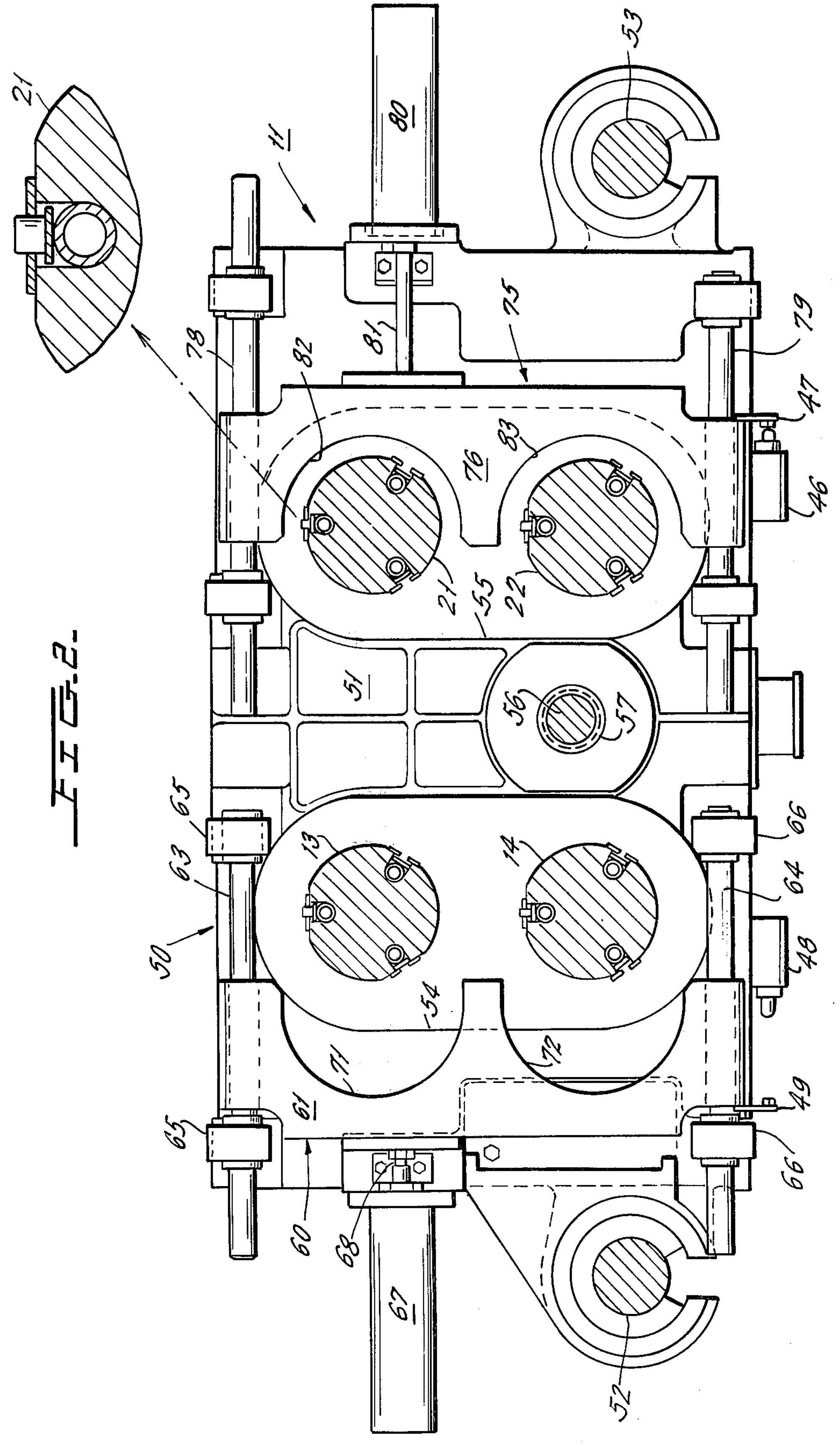
FIG. 2 is an elevation of the head adjusting device looking in the direction of arrows 2—2 of FIG. 1.

Since slitter stations 11, 12 are substantially of identical construction, for the sake of brevity, only station 11 will be described in detail with particular reference to FIGS. 1 and 2. A plurality of head pairs 15, 16, only one of which is shown in FIGS. 1 and 2, are prevented from rotating with respect to drive shafts 13, 14, respectively, and are releasably held in adjusted position along the lengths of shafts 13, 14 by a pneumatically actuated gang locking means of the type described in the G. Weiskopf copending U.S. Pat. application Ser. No. 456,012 filed Mar. 29, 1974, now U.S. Pat. No. 3,951,024 for GANG LOCKING MEANS FOR SLITTER HEADS and assigned to the assignee of the instant invention. A similar gang locking apparatus releasably holds the plurality of slitter head pairs 23, 24 in adjusted positions along their respective drive shafts 21, 22.

Common head adjusting means 50 is provided to sequentially engage each head pair 15, 16 of the plurality of head pairs keyed to shafts 13, 14 and to sequentially engage each of the slitter head pairs 23, 24 keyed to shafts 21, 22 and to move these head pairs to required transverse positions across the work path along which relatively wide web 20 travels. Head adjusting means 50 includes carrier plate 51 positioned in a plane perpendicular to the longitudinal axis of drive shafts 13, 14, 21, 22 and is mounted to move along the axis of guide shafts 52, 53 that extend parallel to drive shafts 13, 14, 21, 22. Carrier 51 is provided with clearance aperture 54 through which drive shafts 13, 14 extend and which is large enough so that scoring heads 15, 16 will not interfere with movement of carrier 51. Another aperture 55 is provided in carrier 51 for clearance of drive shafts 21, 22 and the slitter heads 23, 24 mounted thereto.

Disposed between shafts 14 and 22 and extending parallel thereto is lead screw 56 threadably engaged with nut 57 fixedly secured to carrier 51 so that rotation of lead screw 56 is effective to move head adjusting means 50 along guide shafts 52, 53. Head adjusting means 50 also includes head engaging mechanism 60 comprising spaced plates 61, 62 mounted on guide rods 63, 64. Upper guide rod 63 is guided for movement parallel to the plane of carrier 51 by apertures in standoffs 65, 65 projecting transverse to the plane of carrier 51. Similar guidance is provided for rod 64 by clearance apertures in standoffs 66, 66. Double acting power cylinder 67 is mounted to plate 68 secured to carrier 51 and includes operating arm 69 connected to plate 70 which is connected to plates 61, 62. Thus, acutation of power cylinder 67 is effective to move plates 61, 62 parallel to carrier 51 toward and away from drive shafts 13, 14. The aligned arcuate notches 71, 71 and 72, 72 along the inboard edges of plates 61, 62 are proportioned so that with cylinder rods 69 retracted plates 61, 62 are retracted or moved outward to the positions shown in FIGS. 1 and 2. In this position head engaging mechanism 60 will not engage any of the plurality of head pairs 15, 16 mounted on drive shafts 13, 14. However, when power cylinder 67 is actuated to extend arm 69 thereof, plates 61, 62 move inward toward drive shaft 13, 14, with this motion being limited by the engagement of extension 49 with limit switch 48. If plates 61, 62 are aligned with a particular head pair 15, 16, plates 61, 62 will engage same on opposite sides of head pair 15, 16 so that subsequent movement of carrier 51 along its guide shafts 52, 53 is effective to move this particular head pair 15, 16 to a desired location along drive shafts 13, 14. When this location is reached lead screw 56 stops rotating and power cylinder 67 is actuated to retract plates 61, 62.

Head adjusting means 50 is provided with another head engaging mechanism 75 for sequentially engaging each of the head pairs 23, 24 for moving same to selected locations along their drive shafts 21, 22. Mechanism 75 is essentially a mirror image of mechanism 60 and includes spaced plates 76, 77 having upper and lower guide rods 78, 79 extending therefrom toward rods 63, 64 to guide movement of plates 76, 77 parallel to the plane of carrier 51. Double acting power cylinder 80, secured to carrier 51, is provided with operating extension 81 secured to plates 76, 77 for movement of the latter toward and away from slitter drive shafts 21, 22. Aligned arcuate notches 82, 83 in the inboard edges of plates 76, 77 are proportioned and operatively positioned so that with power cylinder extension 81 retracted plates 76, 77 are moved to outboard positions clear of the slitter head pairs mounted on drive shaft 21, 22.

When power cylinder 80 is actuated to project extension 81, plates 76, 77 move inward toward drive shafts 21, 22 to the head engaging position limited by the engagement of extension 47 with limit switch 64 shown in FIG. 2. When a head pair 23, 24 is aligned with the space between plates 76, 77 and power cylinder extension 81 is projected, plates 76, 77 are positioned on opposite sides of head pair formations so that subsequent rotation of lead screw 56 is effective to move this head pair 23, 24 along drive shafts 21, 22 to a selected location at which time lead screw 56 stops rotating and cylinder 80 is actuated to retract plates 76, 77.

Figure 5:
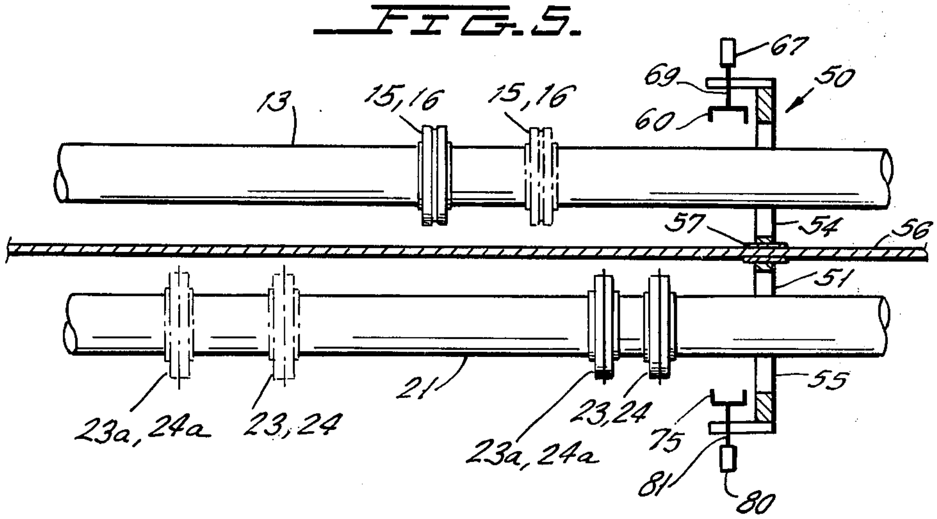
FIG. 5 through 9 are plan views in schematic form illustrating various functions of power adjusted slitter apparatus constructed in accordance with teachings of the instant invention.
Figure 9:
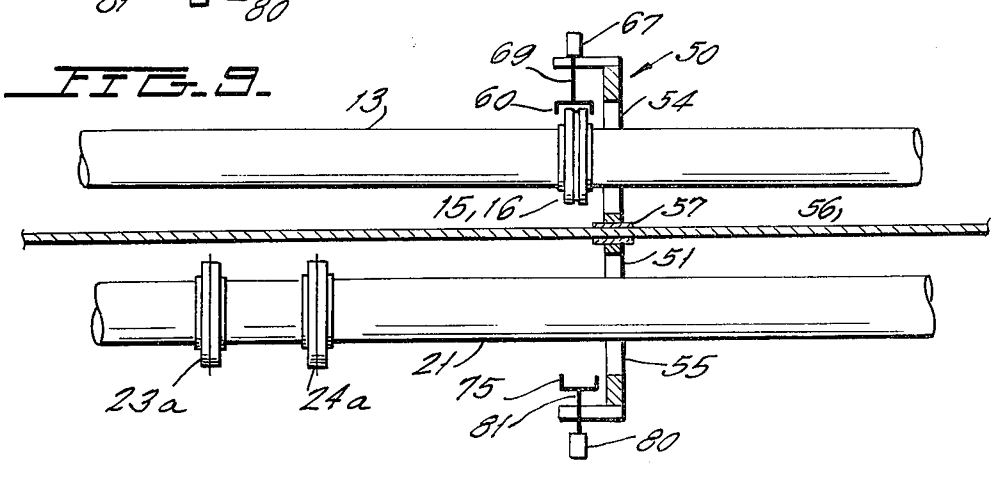

For a brief explanation of operation for the apparatus previously described, reference is now made to the schematics of FIGS. which illustrate movement of head pairs from random starting positions shown in solid lines in FIG. 5 to new set-up positions shown in phantom in FIG. 5 and in solid lines in FIG. 9. In FIG. 5 common lead adjusting means 50 is shown at a position near the right ends of the drive shafts. This position, or the corresponding position at the extreme left of the drive shafts, is occupied by head adjusting means 50 when a web is moving through the slitter station. It is noted that adjusting means 50 is moved to its parking positions outboard of the web edges by the same lead screw 56.

Figure 6:
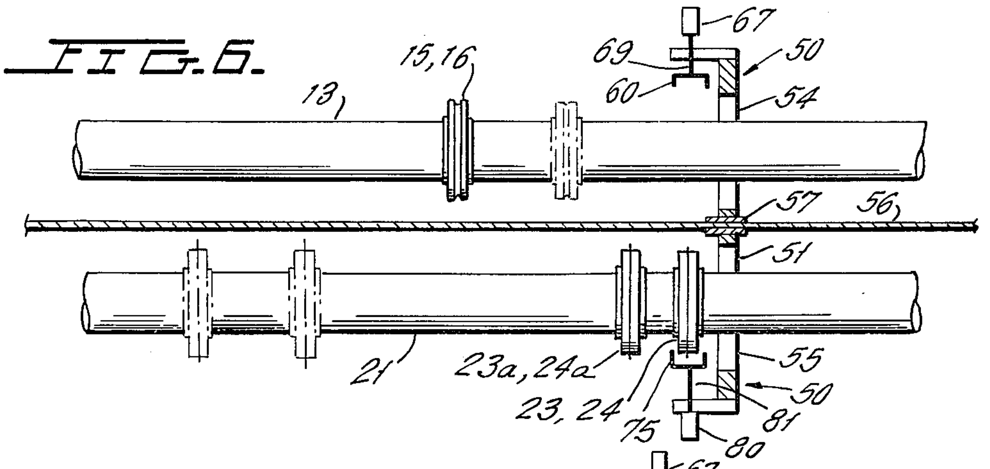

In FIG. 6, head adjusting means 50 is positioned with head engaging mechanism 75 actuated or moved inward into operative engagement with head pair 23, 24, so that subsequent rotation of lead screw 56 to move head adjusting means 50 also moves head pair 23, 24.

Figure 7:
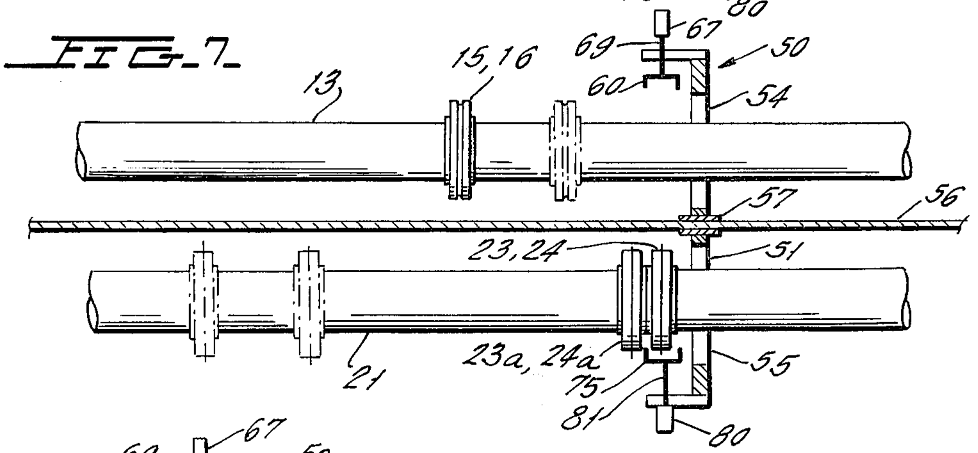

In FIG. 7 head adjusting means 50 has moved head pair 23, 24 into contact with adjacent head pair 23*a*, 24*a* so that continued movement of head adjusting means 50 to the left moves both head pairs 23, 24 and 23*a*, 24*a* simultaneously to the left. Since head engaging mechanism 60 has not been actuated, head adjusting means 50 is free to move past head pair 15, 16 without disturbing the position of the latter.

Figure 8:
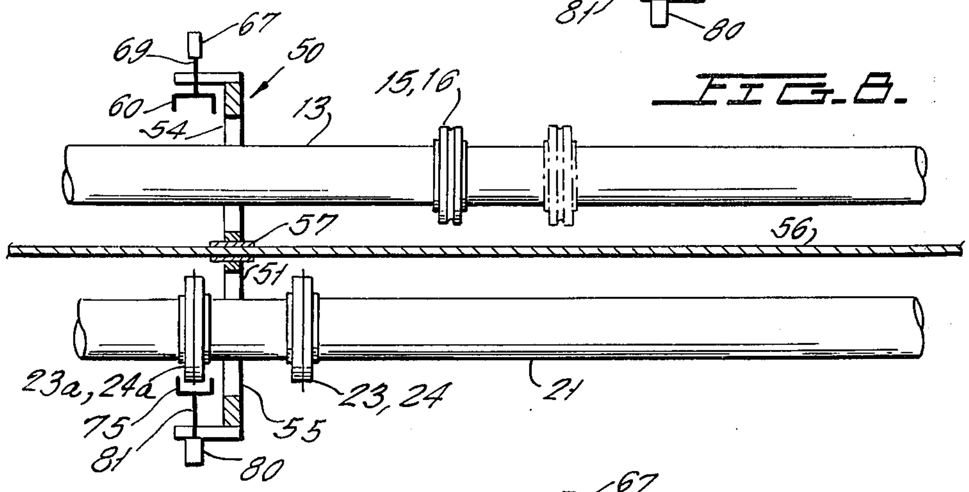

FIG. 8 shows head pair 23, 24 remaining in a desired position. After head adjusting means 50 moved head pair 23, 24 to the position of FIG. 8, head engaging mechanism 75 was deactuated or retracted to release head pair 23, 24 and adjusting means 50 was moved to the left until mechanism 75 was aligned with head pair 23*a*, 24*a* after which mechanism 75 was again actuated to engage head pair 23*a*, 24*a*. Thereafter, as adjusting means 50 continued moving to the left, head pair 23*a*, 24*a* was moved to the left while head pair 23, 24 remained in its desired adjusted position of FIG. 8.

In FIG. 9 head adjusting means 50 is shown with its head engaging mechanism 60 actuated into operative engagement with head pair 15, 16, so that the latter can be moved by adjusting means 50 to a desired position, after which mechanism 60 disengages head pair 15, 16 and adjusting means 50 continues moving to the right to a parking position outboard of a web (not shown) traveling through the slitter station. An electronic register means (not shown) is utilized to store signals indicative of the actual positions of each head pair and the head adjusting means.

Thus, it is seen that the instant invention provides a novel power adjusted duplex slitter in which a common head adjusting means sequentially adjusts the position of each head pair on the slitter and creaser shafts.

Although in the foregoing preferred embodiments has been discussed, many variations and modifications will now become apparent to those skilled in the art, and it is therefore understood that this invention is not limited by the disclosure but only by the appending claims.

We claim:

1. Slitting apparatus for longitudinally cutting a relatively wide web of sheet material into a plurality of narrower webs while such wide web is moving longitudinally; said apparatus comprising first and second stations each including first and second parallel shafts mounted for rotation on fixed centers, a plurality of tool mounting head pairs rotated by said shafts and adjustable therealong; power driven adjusting means for operatively positioning the head pairs of said first station while the head pairs of the said second station are slitting a wide web as it moves through an operating area of said second station and for operatively positioning the head pairs of said second station while the head pairs of the first station are slitting a wide web as it moves through an operating area of said first station; each of said fixed centers remaining in the same respective position during slitting and during adjustment of said head pairs along said shafts.

2. Slitting apparatus as set forth in claim 1 in which the power driven adjusting means is movable to a parking position outboard of a wide web as it moves through the operating area.

3. Slitting apparatus as set forth in claim 2 also including power operating means having elements operatively connected to said adjusting means for moving the latter parallel to said shafts to operatively position said head pairs, said elements of said power operating means also moving said adjusting means to said parking position.

4. Slitting apparatus as set forth in claim 1 in which the adjusting means is operable to sequentially engage the head pairs.

5. Slitting apparatus as set forth in claim 1 in whic the adjusting means includes a first section selectively operable to engage in sequence each of the head pairs of the first station; said adjusting means also including a second section selectively operable to engage in sequence each of the head pairs of the second station.

6. Slitting apparatus as set forth in claim 5 in which the power driven adjusting means is movable to a parking position outboard of a wide web as it moves through the operating area.

7. Slitting apparatus as set forth in claim 6 in which the adjusting means for each of the stations includes a carrier mounted for longitudinal movement parallel to the axes of the shafts and a head engaging section mounted to said carrier for longitudinal movement therewith; said head engaging section also being mounted to said carrier for movement relative thereto toward and away from said shafts to respectively engage and disengage the head pairs.

8. Slitting apparatus for longitudinally cutting a relatively wide web of sheet material into a plurality of narrower webs while such wide web is moving longitudinally; said apparatus comprising first and second stations each including first and second parallel shafts, a plurality of tool mounting head pairs keyed to said shafts and adjustable therealong; a first power driven adjusting means including a common head engaging section for sequentially engaging and operatively positioning each of the head pairs of the first station while a wide web passes through an operating area of the second station; and a second power driven adjusting means including another common head engaging section for sequentially engaging and operatively positioning each of the head pairs of the second station while a wide web passes through an operating area of the first station.

9. Slitting apparatus for longitudinally cutting a relatively wide web of sheet material into a plurality of narrower webs while such wide web is moving longitudinally; said apparatus comprising first and second stations each including first and second parallel shafts, a plurality of tool mounting head pairs keyed to said shafts and adjustable therealong; a first power driven adjusting means to sequentially engage and operatively position the head pairs of the first station while a wide web passes through an operating area of the second station; and a second power driven adjusting means for sequentially engaging and operatively positioning the head pairs of the second station while a wide web passes through an operating area of the first station; said adjusting means for each of the stations including a carrier mounted for longitudinal movement parallel to the axes of the shafts and a head engaging section mounted to said carrier for longitudinal movement therewith; said head engaging section also being mounted to said carrier for movement relative thereto toward and away from said shafts to respectively engage and disengage the head pairs.

10. Slitting apparatus as set forth in claim 9 in which each of the adjusting means is movable to a parking position outboard of a wide web as it moves through the operating area.

11. Slitting apparatus as set forth in claim 10 in which there are first and second lead screw connected respectively to the carriers of the first and second stations for moving the head pairs and parking the respective adjusting means.

* * * * *